United States Patent
Deurloo et al.

(10) Patent No.: US 7,468,878 B2
(45) Date of Patent: Dec. 23, 2008

(54) LOW VOLTAGE OUTPUT FOR AN ELECTRONIC BALLAST

(75) Inventors: Oscar J. Deurloo, Rosmalen (NL); Jonathan Hollander, Hod-Hasharon (IL); Dimitry Orlov, Netanya (IL)

(73) Assignee: Koninklijke Philips Electronics N.V., Eindhoven (NL)

( * ) Notice: Subject to any disclaimer, the term of this patent is extended or adjusted under 35 U.S.C. 154(b) by 555 days.

(21) Appl. No.: 10/499,160

(22) PCT Filed: Dec. 19, 2002

(86) PCT No.: PCT/US02/40918

§ 371 (c)(1), (2), (4) Date: Jun. 16, 2004

(87) PCT Pub. No.: WO03/056537

PCT Pub. Date: Jul. 10, 2003

(65) Prior Publication Data

US 2004/0263091 A1    Dec. 30, 2004

Related U.S. Application Data

(60) Provisional application No. 60/342,951, filed on Dec. 21, 2001.

(51) Int. Cl.
    *H02H 5/04* (2006.01)
(52) U.S. Cl. ..................... 361/93.8; 361/93.1
(58) Field of Classification Search ............... 315/247, 315/224, 209 R, 291, 307; 361/93.8, 93.1, 361/93.7
    See application file for complete search history.

(56) References Cited

U.S. PATENT DOCUMENTS

| | | | | | |
|---|---|---|---|---|---|
| 3,913,002 | A | * | 10/1975 | Steigerwald et al. | 363/18 |
| 4,642,525 | A | * | 2/1987 | Widmayer | 315/219 |
| 5,287,040 | A | | 2/1994 | Lestician | 315/291 |
| 5,491,388 | A | * | 2/1996 | Nobuyuki et al. | 315/308 |
| 5,528,111 | A | * | 6/1996 | Konopka et al. | 315/291 |
| 5,680,015 | A | | 10/1997 | Bernitz et al. | 315/291 |
| 6,194,847 | B1 | * | 2/2001 | Hollaway | 315/360 |
| 6,304,039 | B1 | | 10/2001 | Appelberg et al. | 315/169.3 |
| 6,570,347 | B2 | * | 5/2003 | Kastner | 315/307 |
| 6,680,585 | B2 | * | 1/2004 | Trestman | 315/291 |
| 6,838,834 | B2 | | 1/2005 | Okawa | |
| 2002/0047607 | A1 | * | 4/2002 | Zudrell-Koch et al. | 315/224 |
| 2005/0231128 | A1 | * | 10/2005 | Franklin | 315/224 |

* cited by examiner

Primary Examiner—Tuyet Vo

(57) ABSTRACT

A high frequency electronic ballast for main loads, such as an HID lamp, includes a regulated low voltage output to drive auxiliary loads. A low voltage microcontroller generates a low voltage drive signal in response to voltage and frequency of a high voltage power supply. A switch operably connected to the high voltage power supply and responsive to the low voltage drive signal provides the regulated low voltage output to drive the auxiliary devices, such as a back-up incandescent lamp and/or an insulation detector. In one embodiment, the low voltage output may be responsive to the HID lamp power, e.g., a control signal from a ballast microcontroller, so that the back-up incandescent lamp is energized when the HID lamp is not providing sufficient illumination.

6 Claims, 12 Drawing Sheets

LOW VOLTAGE OUTPUT FOR AN ELECTRONIC BALLAST

This application is a 371 of PCT/US02/40918 filed Dec. 19, 2002 which claims benefit of Ser. No. 60/342,951 filed Dec. 21, 2001.

The technical field of this disclosure is high frequency ballast systems, particularly, a high frequency electronic ballast with low voltage output.

High Intensity Discharge (HID) lamps, such as mercury vapor, metal halide, high-pressure sodium, and low-pressure sodium, are used for a variety of lighting tasks. As HID lamps have become more popular, electronic ballasts for HID lamps have been developed.

One challenge with electronic ballasts for HID lamps is to provide efficient, well regulated, low voltage power. Electronic ballasts for HID lamps often provide 120 Volt taps for auxiliary power. The tap can be used to power back-up lighting which is required when waiting for an HID lamp to re-strike after power loss, to power external controls, or to power other devices. Currently, the 120 Volt tap must be connected to the powered device through a transformer or other external circuitry. Known electronic taps have limited voltage regulation, and may even reduce the life of the device fed from the auxiliary power due to high current crest factor and high electromagnetic interference.

It would be desirable to have an electronic ballast with low voltage output that would overcome the above disadvantages.

One aspect of the present invention provides an electronic ballast with low voltage output.

Another aspect of the present invention provides an electronic ballast with low voltage output having improved voltage regulation.

Another aspect of the present invention provides an electronic ballast with low voltage output providing power with a reduced current crest factor and less electromagnetic interference.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

Figure 1:
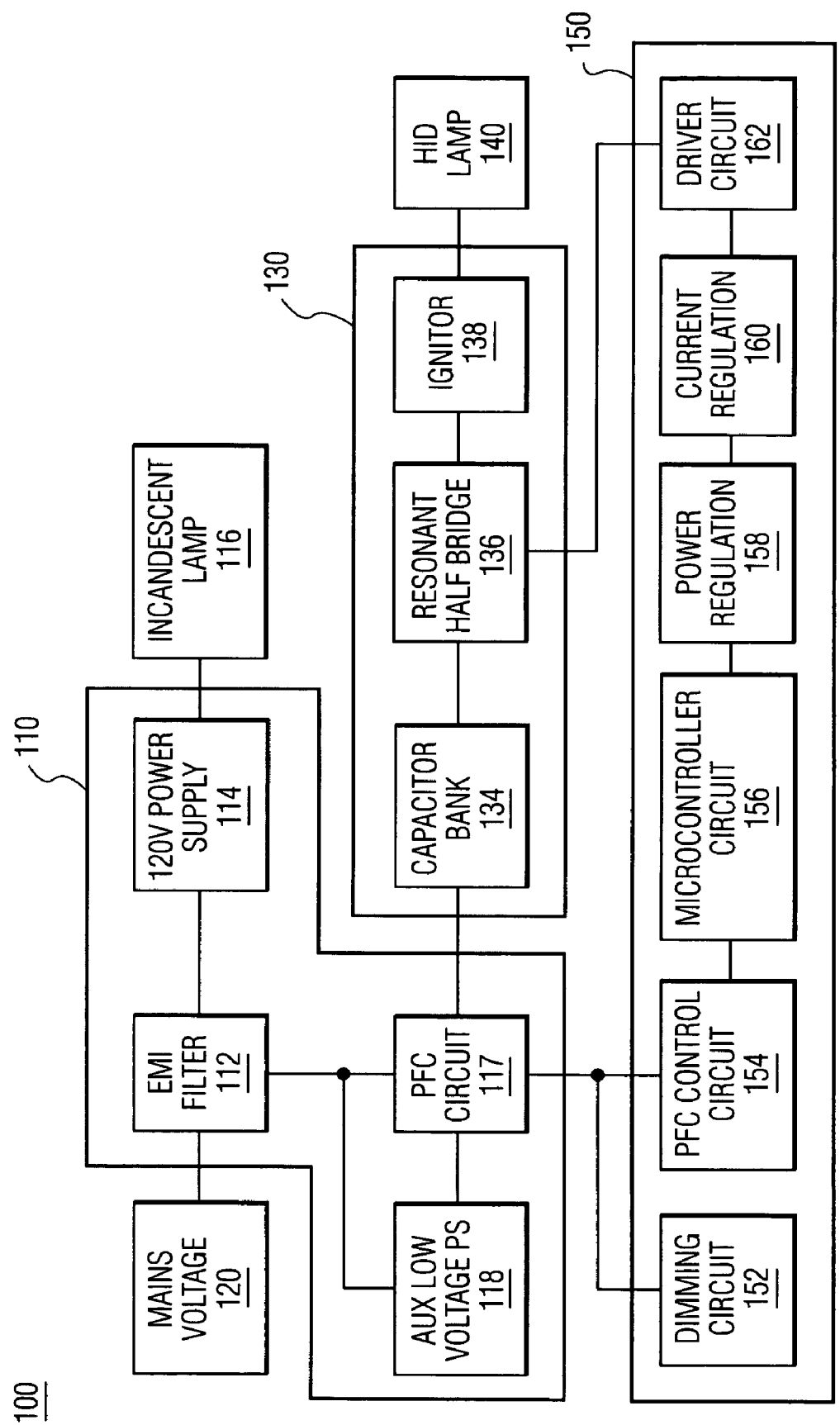
FIG. 1 shows a block diagram of an electronic ballast with low voltage output made in accordance with the present invention.

The present invention provides a high frequency electronic ballast with low voltage output, comprising a high voltage power supply 200 generating high voltage power 234 at a voltage and a frequency; a low voltage microcontroller 214 which is responsive to the voltage and the frequency of the high voltage power 234 and generates a low voltage drive signal 240; and a switch 216 operably connected to the high voltage power supply 200 and responsive to the low voltage drive signal 240. The low voltage output of the switch 216 can be used to drive auxiliary low voltage loads 220, such as a back-up incandescent lamp 116. The low voltage output can be responsive to HID lamp power, so that the back-up incandescent lamp 116 is energized when the HID lamp is not providing illumination.

FIG. 1 shows a block diagram of an electronic ballast made in accordance with the present invention. Some connections between blocks have been omitted for clarity of illustration. The electronic ballast 100 comprises a power supply 110 fed by mains voltage 120, lamp power circuit 130 supplying high intensity discharge (HID) lamps 140, and ballast control circuit 150. The power supply 110 conditions and adjusts power for the electronic ballast 100, the lamp power circuit 130 delivers power to the HID lamps 140, and the ballast control circuit 150 controls the operation of the electronic ballast 100.

The power supply 110 comprises an electromagnetic interference (EMI) filter 112 on the input of power supply 110, a 120V power supply 114 for powering a back-up incandescent lamp 116, a power factor correction (PFC) circuit 117, and an auxiliary low voltage power supply 118 for powering the ballast control circuit 150. The lamp power circuit 130 comprises a capacitor bank 134, a resonant half bridge 136, and an ignition circuit 138. The ballast control circuit 150 comprises a dimming circuit 152, a power factor correction (PFC) control circuit 154, a microcontroller circuit 156, a power regulation circuit 158, a current regulation circuit 160, and a driver circuit 162.

Figure 2A:
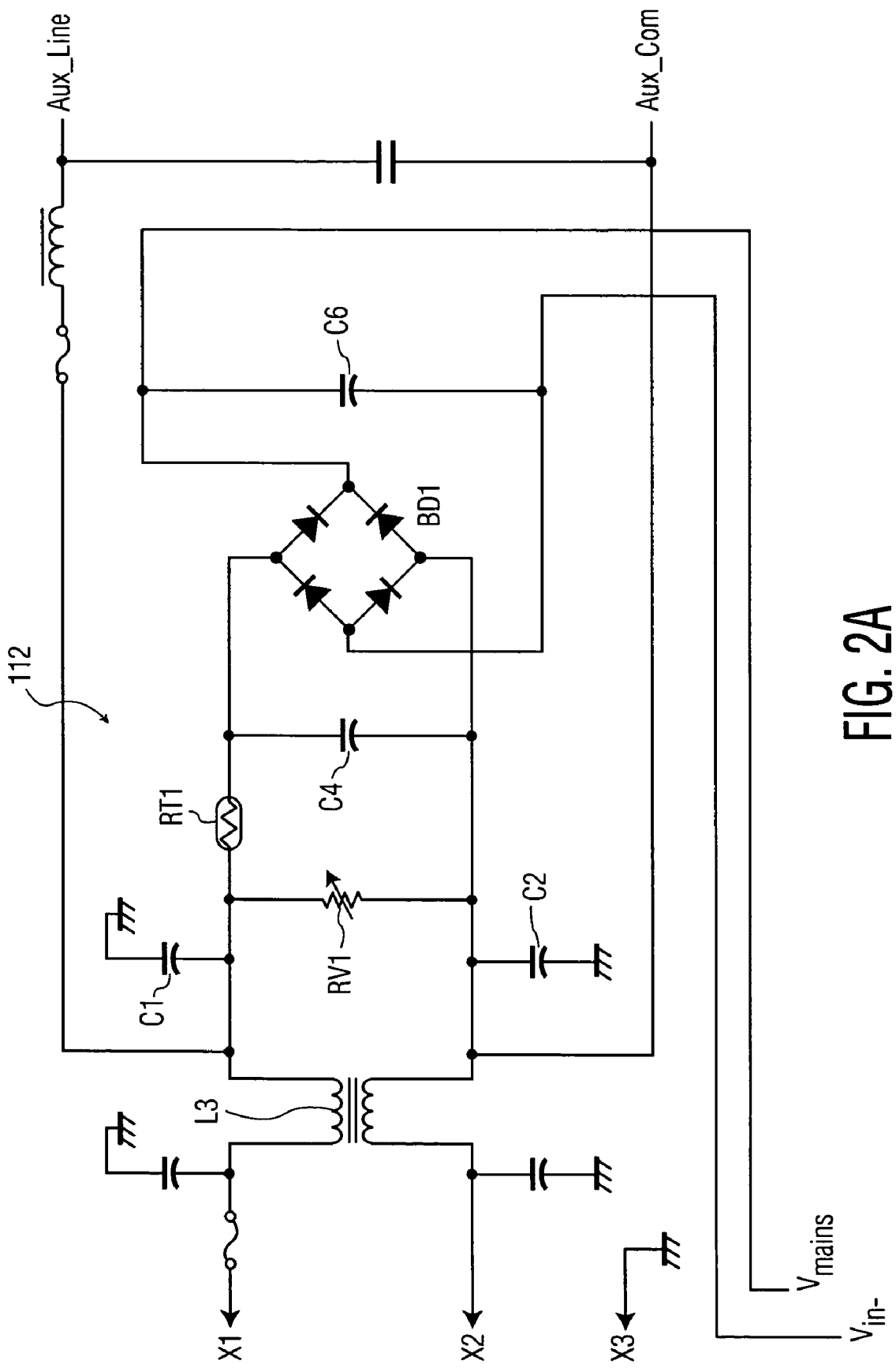
FIGS. 2A-2C show a schematic diagram of a power supply for an electronic ballast with low voltage output made in accordance with the present invention.
Figure 2B:
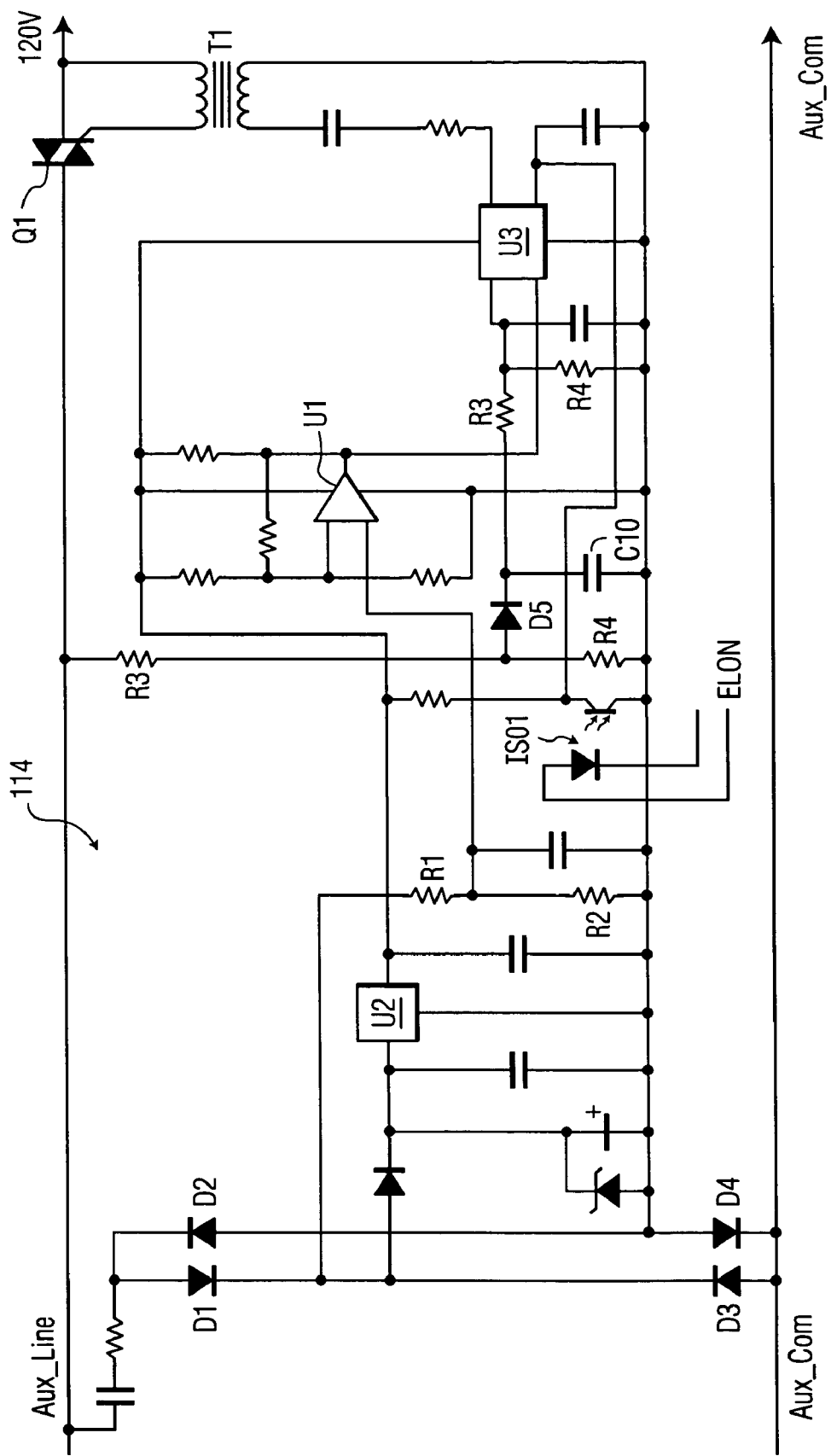
Figure 2C:
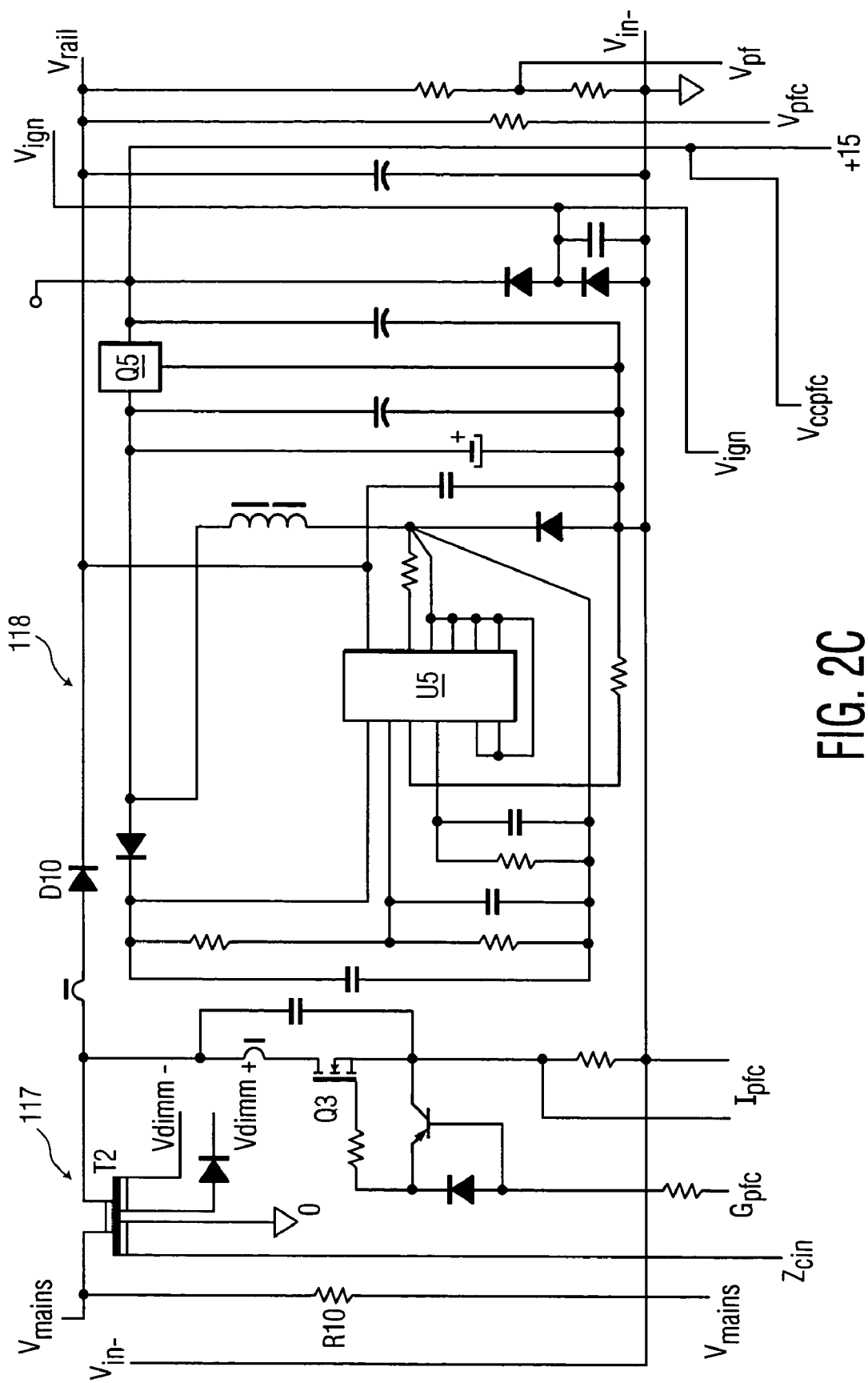

FIGS. 2A-2C show a schematic diagram of a power supply for an electronic ballast with low voltage output made in accordance with the present invention. Referring to FIG. 2A, mains voltage is supplied on terminal connections X1, X2, and X3. The mains voltage can vary from about 180V to 305V, and is typically about 200V to 277V. The EMI filter 112 connected to mains voltage comprises transformer L3; capacitors C1, C2, C4, C6; and bridge rectifier BD1. Circuit protection can be provided by inrush current limiter RT1 and voltage suppression varistor RV1. The output of EMI filter 112 continues to the low voltage power supply as the Aux_Line power. An auxiliary line voltage is tapped after transformer L3 to supply the 120V power supply as the mains voltage signal Vmains.

Referring to FIG. 2B, the 120V power supply 114 steps down the 200-277 volt Aux Line power to 120 volts to provide power to the back-up incandescent lamp. HID lamps have a low light output during warm-up phase, which occurs for about the first minute after power is supplied. HID lamps also need to cool down before they can be reignited, typically for about 5 to 15 minutes. The back-up incandescent lamp supplies lighting when the HID lamp is not burning or burning at a low light level. The back-up incandescent lamp can be a halogen lamp or any other 120V lamp as desired. The 120V power supply 114 is energized anytime the electronic ballast is energized. An ELON signal from the ballast control circuit determines when the 120V power supply 114 supplies power to the back-up incandescent lamp. The ELON signal turns on the light whenever the HID lamp power is less than a predetermined setpoint, such as half nominal HID lamp power, indicating that the HID lamp is not providing substantial light.

The 120V power supply 114 comprises a comparator circuit responsive to an Aux_Line voltage signal and providing an Aux Line zero crossing signal; a 120V microcontroller responsive to the Aux Line zero crossing signal and an Aux Line voltage amplitude signal, and providing a 120V drive signal; and a 120V driver circuit responsive to the 120V drive signal and providing 120V power to the back-up incandescent lamp. The ELON control signal from the ballast control circuit switches the comparator circuit and the 120V microcontroller to turn the 120V power to the back-up incandescent lamp on and off as required.

The full bridge comprising diodes D1, D2, D3, and D4 rectifies the 240-277 volt Aux_Line power. The rectified signal provides an Aux_Line reference signal to comparator U1 after being regulated by voltage regulator U2. The rectified signal also provides a variable Aux_Line voltage signal to the comparator U1 after being scaled by the voltage divider comprising resistors R1 and R2. The comparator U1 compares the Aux_Line reference signal to the Aux_Line voltage signal and provides an Aux Line zero crossing signal to the 120V microcontroller U3. The Aux Line zero crossing signal is used to determine the Aux Line frequency.

The Aux_Line power is scaled by the voltage divider comprising resistors R3 and R4 and provided to the 120V microcontroller U3 as an Aux Line voltage amplitude signal after further conditioning with diode D5, capacitors C10, and resistors R3, R4.

The 120V microcontroller U3 uses the Aux Line zero crossing signal and Aux Line voltage amplitude signal to determine a 120V drive signal for triac Q1. The 120V microcontroller U3 employs a preprogrammed look-up table to look-up the desired timing/phase angle of the triac Q1 based on the Aux Line voltage amplitude signal and corrected for the Aux Line frequency as indicated by the Aux Line zero crossing signal. The 120V drive signal switches the triac Q1 through transformer T1 to provide a well-regulated 120V power to the back-up incandescent lamp. The 120V power supply 114 supplies well regulated 120V power, which will increase the life of the back-up incandescent lamp, and provides over voltage protection to the back-up incandescent lamp.

The ELON control signal from the ballast control circuit switches optical isolator ISO1 to turn the 120V power to the back-up incandescent lamp on and off as required. To turn the 120V power off, optical isolator ISO1 grounds the reference voltage to comparator U1 and the master clear pin on the 120V microcontroller U3.

FIG. 2C shows a schematic diagram of a power factor correction and low voltage power supply for an electronic ballast made in accordance with the present invention. The power factor correction circuit 117 receives the output voltage of the EMI filter and boosts the power supplied to the auxiliary low voltage power supply 118 and the lamp power circuit.

The power factor correction circuit 117 provides a high power factor and low total harmonic distortion. The power factor correction circuit 117 adjusts the rail voltage supplying the lamp power circuit with respect to the mains voltage to reduce the power losses, which would occur by holding a fixed rail voltage independent of the mains voltage. Power factor correction circuit 117 comprises transformer T2, switch Q3 and diode D10. The mains voltage signal Vmains is passed through resistor R10 to provide the mains voltage signal Vmains to the PFC control circuit in the ballast control circuit. The PFC control circuit processes the mains voltage signal Vmains, PFC current signal Ipfc, and PFC voltage signal Vpfc, and returns a PFC gate signal Gpfc to the power factor correction circuit 117. The PFC gate signal Gpfc cycles switch Q3 so that both output voltage requirements and input current requirements are met. In one embodiment, the rail voltage Vrail can be set to discrete values for particular mains voltages. For example, if the mains voltage is below about 210-215 volts, the rail voltage can be set to about 400 volts. Likewise, for mains voltages of about 210 to 255 volts and above about 250 volts, the rail voltage can be set to about 450 volts and about 465-480 volts, respectively. Hysterisis can be used to prevent inadvertent switching of the rail voltage near the mains power voltage setpoints. Those skilled in the art will appreciate that different mains voltage ranges and rail voltages can be used as suited for particular applications. Transformer T2 also provides a zero current input signal ZCin to the PFC control circuit to indicate when current in the transformer T2 has reached zero. Transformer T2 also provides power to the dimming circuit in the ballast control circuit through Vdimm+ and Vdimm−. The power factor correction circuit 117 provides voltage signals to the ballast control circuit through the PFC voltage signal Vpfc and the scaled PFC output voltage signal Vpf.

The auxiliary low voltage power supply 118 provides power to the ballast control circuit components. The auxiliary low voltage power supply 118 takes power from the output of the power factor correction circuit 117 and produces lower voltage power at 15 volts using switched mode power supply IC U5. Voltage regulator Q5 regulates the output from the switched mode power supply IC U5. The output of voltage regulator Q5 provides power to the PFC controller through the Vccpfc line and power to the other ballast control circuit components through the +15 line.

Figure 3:
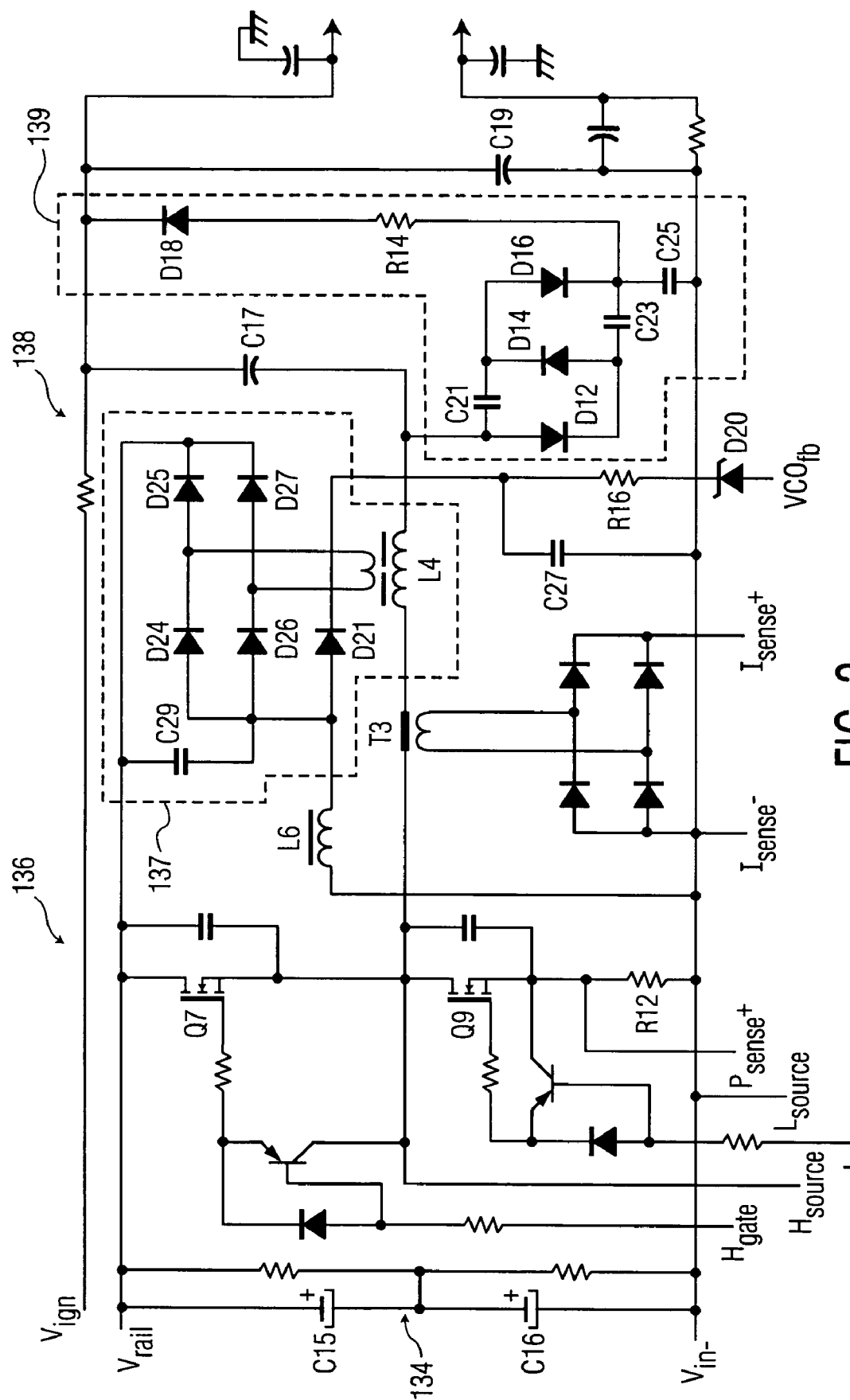
FIG. 3 shows a schematic diagram of a lamp power circuit for an electronic ballast with low voltage output made in accordance with the present invention.

FIG. 3 shows a schematic diagram of a lamp power circuit for an electronic ballast with low voltage output made in accordance with the present invention. The lamp power circuit 130 comprises capacitor bank 134, resonant half bridge 136, and ignitor 138. Capacitor bank 134 acts as an energy buffer. The resonant half bridge 136 receives power from the EMI filter and converts the power to drive the HID lamp. The ignitor 138 provides a high voltage to the HID lamp during lamp startup.

Capacitor bank 134 on the output of the power factor correction circuit comprises electrolytic capacitors C15 and C16. Resonant half bridge 136 comprises switches Q7, Q9, inductor L4, and capacitor C17. The power to the HID lamp is controlled by the impedance of inductor L4 and capacitor C17, and the frequency of the alternate switching of switches Q7 and Q9 in response to high gate signal Hgate and low gate signal Lgate, respectively. High gate signal Hgate and low gate signal Lgate and their respective grounds, HSource and LSource, are supplied by the ballast control circuit.

Signals from the resonant half bridge 136 also provide information to the ballast control circuit. A lamp power signal Psense+ is provided by measuring the voltage across resistor R12 to indicate the power input to the resonant half bridge 136. A sensed lamp current signal Isense+ to Isense− is provided by measuring the current through the transformer T3 which is mounted in series with inductor L4 and capacitor C17. The voltage for the HID lamp can be determined by dividing the lamp power by the lamp current.

Ignitor 138 comprises DC offset circuit 139 operably connected to the connection of inductor L4 and capacitor C17, clamping circuit 137 operably connected to a secondary winding on inductor L4, and C19. The ignition voltage for the HID lamp is generated by the resonance between the inductor L4 and the capacitor C19, in conjunction with a DC offset voltage applied to capacitor C17 by the DC offset circuit 139. The resonance is a first harmonic resonance.

The DC offset circuit 139 comprises diodes D12, D14, D16, capacitors C21, C23, C25, resistor R14, and diode D18. The DC offset circuit 139 provides a DC offset voltage to capacitor C17 to reduce currents in switches Q7 and Q9 during generation of the ignition voltage. The magnitude of the DC offset voltage is a fixed ratio of the inductor voltage. The DC offset voltage is controlled by the resonant voltage on inductor L4, which is determined by the current through inductor L4. A feedback loop is provided as transformer T3 measures the current through inductor L4 and provides the sensed lamp current signal Isense+ to Isense− to the ballast microcontroller in the ballast control circuit. The ballast control circuit controls the frequency sweep with the Hgate, Lgate, Hsource, and Lsource signals to switches Q7 and Q9. The DC offset voltage can be set between about 1 kV and 2.5 kV depending on the particular application.

A hardware control/limiting circuit is also provided to control the voltage on inductor L4. The hardware control/limiting circuit comprises coil L6, diode D21, capacitor C27, resistor R16, and zener diode D20. The current through coil L6 generates a voltage that is rectified by diode D21 and filtered by capacitor C27 to produce a voltage controlled oscillator (VCO) feedback signal VCOfb. The VCO feedback signal is provided to the voltage controlled oscillator (VCO) in the ballast control circuit as a feedback control and limit, allowing the ballast control circuit to control the voltage on inductor L4. In one embodiment, the coil L6 is a saturating coil to reduce the effects of switching of the diodes D24, D25, D26, D27.

The clamping circuit 137 comprises a secondary winding of inductor L4, a rectifier bridge of diodes D24, D25, D26, D27, capacitor C29, and diode D21. The clamping circuit 137 conducts if the secondary winding voltage becomes too high, thus limiting the voltage at the inductor L4 to the rail voltage above circuit ground. The winding ratio of the secondary winding of inductor L4 can be used to set the voltage at which the clamping circuit 137 conducts.

In another embodiment, an ignition switch (not shown) responsive to an ignition signal from the ballast control circuit can be provided in series with capacitor C19. The ignition switch can allow the ballast control circuit positive control over the ignition of HID lamp based on the control information provided to the ballast control circuit.

Figure 4A:
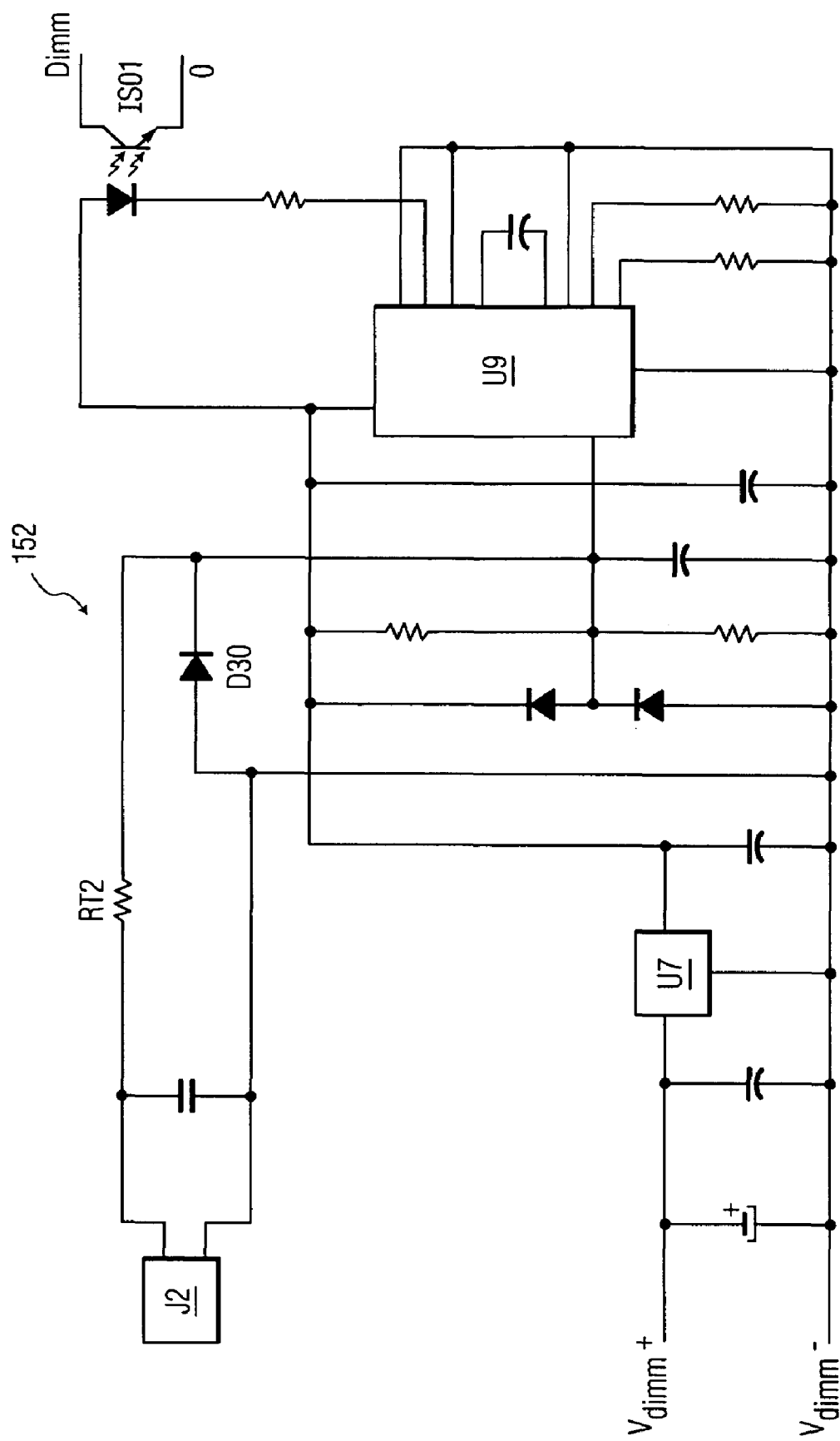
FIGS. 4A-4F show the circuitry of a ballast control circuit for an electronic ballast with low voltage output made in accordance with the present invention.

FIGS. 4A-4F show the circuitry of a ballast control circuit for an electronic ballast with low voltage output made in accordance with the present invention. FIG. 4A shows a schematic diagram of a dimming circuit for an electronic ballast made in accordance with the present invention. An analog dimming signal is a manually or automatically adjustable input signal received by the dimming circuit 152 at jack J2. The analog dimming signal can be 0-10 volts, or other voltage ranges as required for a particular application. The dimming circuit 152 in the ballast control circuit 150 is protected from high input voltage at jack J2 by positive temperature coefficient (PTC) overcurrent protector RT2 and zener diode D30. The analog dimming signal feeds voltage controlled oscillator U9, which converts the analog dimming signal into a frequency dimming signal Dimm with frequency proportional to the analog dimming signal voltage. The frequency dimming signal Dimm is fed to opto-coupler ISO1, which isolates the dimming circuit 152 output from the microcontroller circuit. The power factor correction circuit provides power to the dimming circuit 152 through Vdimm+ and Vdimm−, with voltage regulator U7 providing voltage stabilization.

Figure 4B:
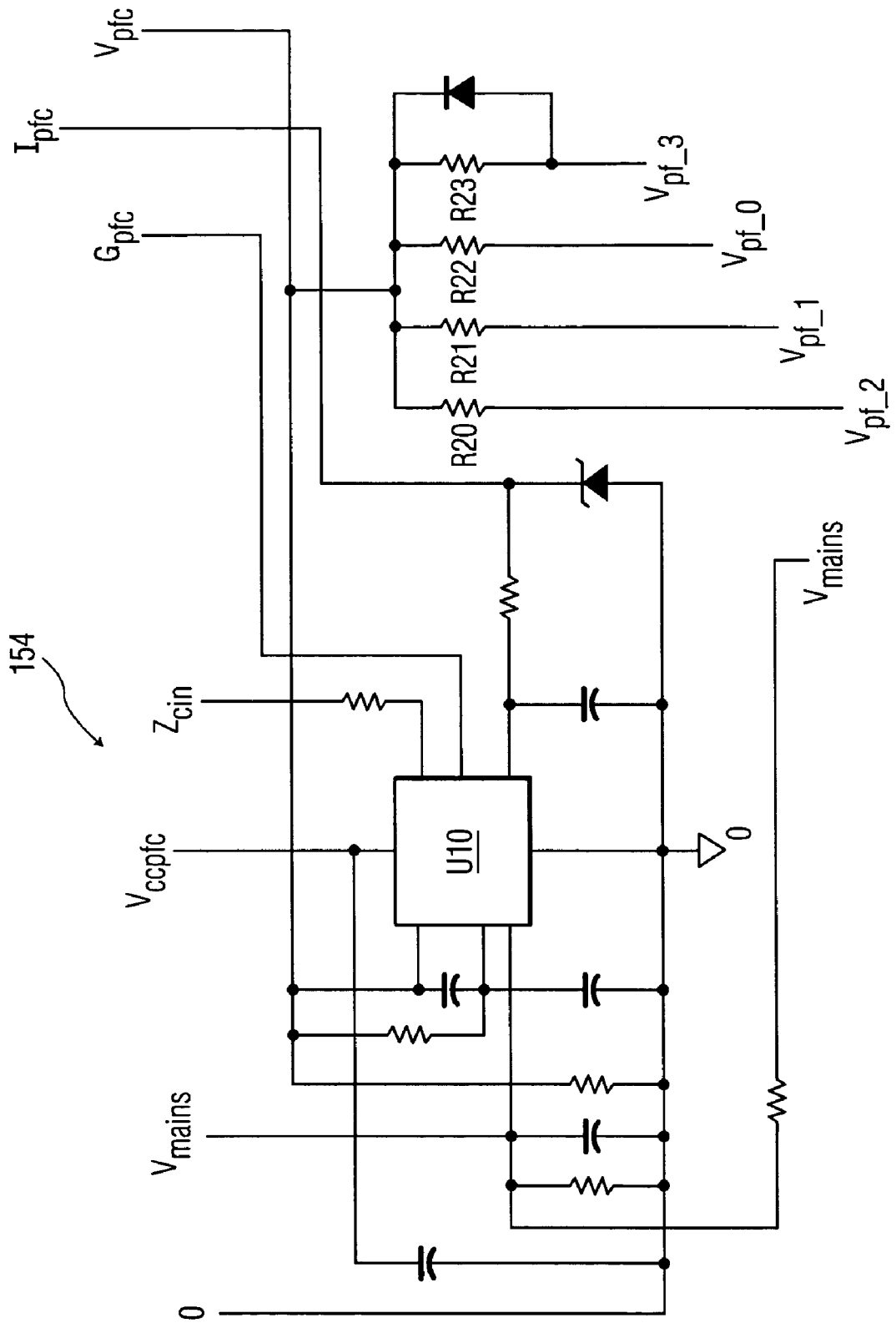

FIG. 4B shows a schematic diagram of a power factor correction (PFC) control circuit 154 in the ballast control circuit 150 for an electronic ballast made in accordance with the present invention. Using power factor correction U10, the PFC control circuit 154 processes the mains voltage signal Vmains, PFC current signal Ipfc, and PFC voltage signal Vpfc from the power factor correction circuit, and returns a PFC gate signal Gpfc to the power factor correction circuit. The PFC control circuit 154 receives a zero current input signal ZCin to indicate when the current in transformer in the PFC circuit has reached zero.

The target rail voltage for a particular mains voltage range is set by the resistor array of resistors R20, R21, R22, and R23. The ballast microcontroller responds to the mains voltage signal Vmains and supplies supply power factor voltage signals Vpf_3, Vpf_2, Vpf_1, and Vpf_0, which switch the various resistors in the resistor array to circuit ground. The resistor array supplies different voltages corresponding to possible rail voltages, which bias the PFC voltage signal Vpfc to the power factor correction U10.

Figure 4C:
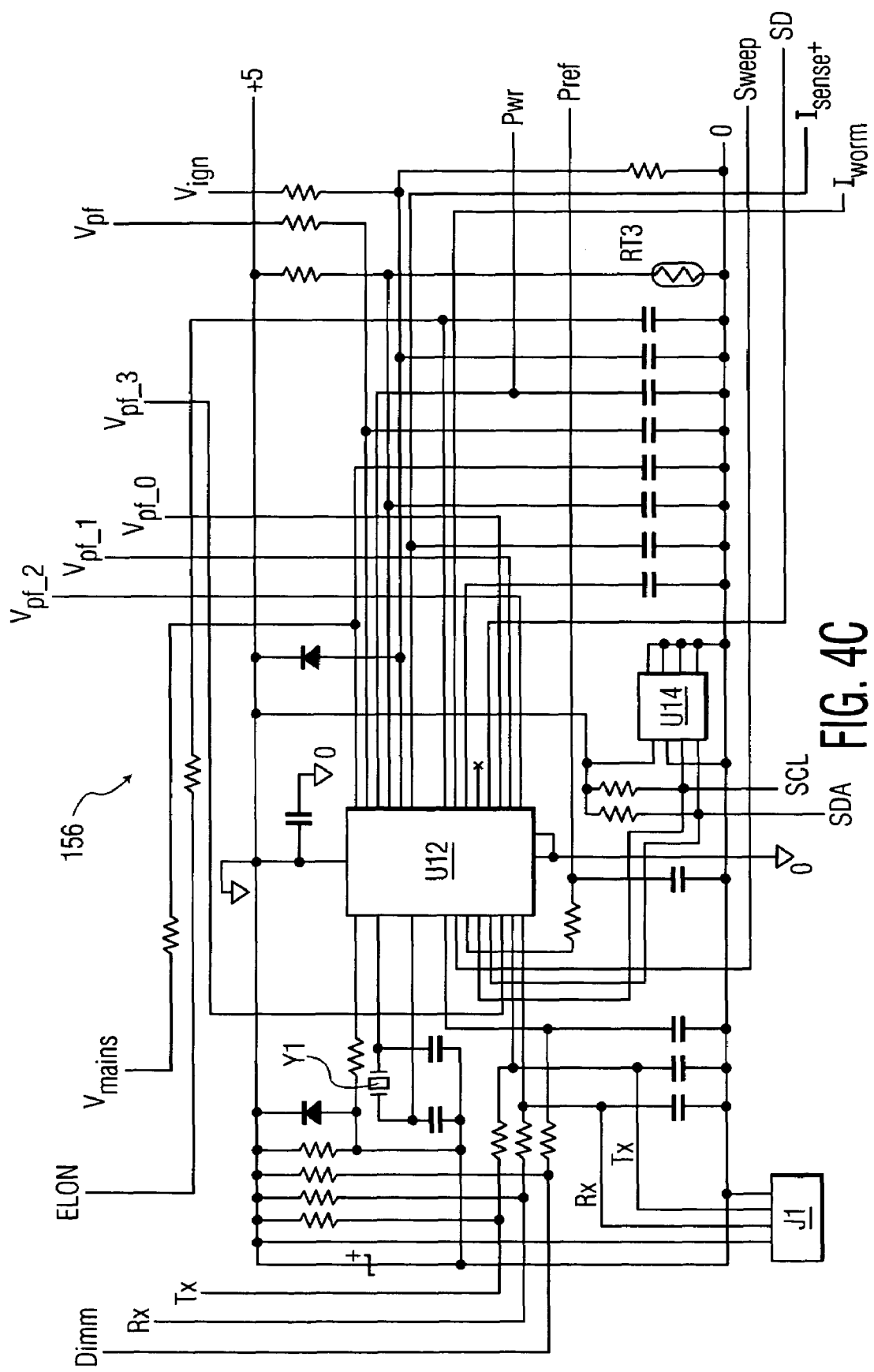
Figure 4D:
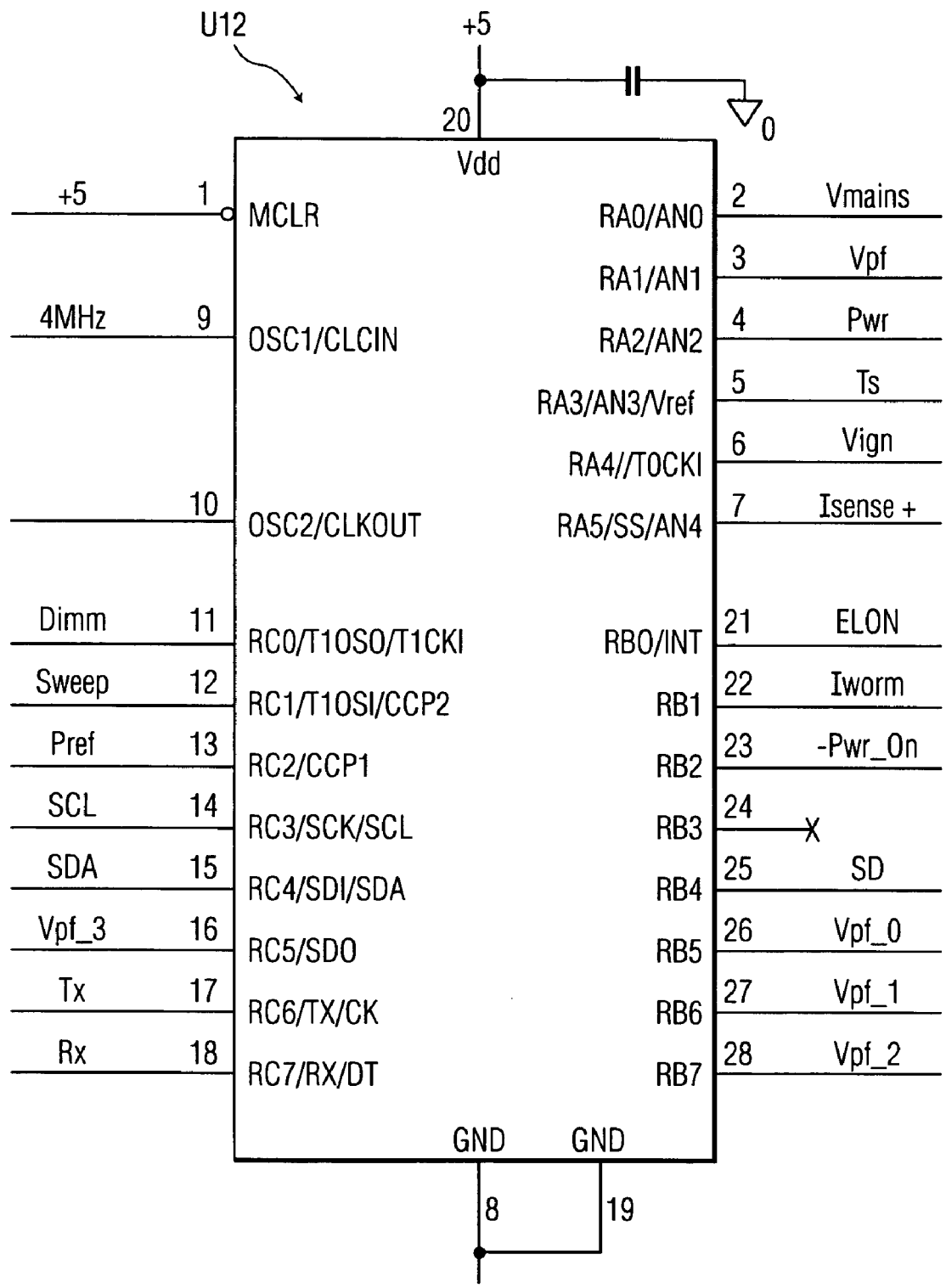

FIGS. 4C & 4D show a schematic diagram of a microcontroller circuit and ballast microcontroller detail, respectively, for an electronic ballast made in accordance with the present invention. The ballast microcontroller U12 is the main control component of the electronic ballast and the ballast control circuit. The microcontroller circuit 156 receives information on the various parameters throughout the electronic ballast and supplies control signals to the various components. Oscillator Y1 provides an oscillating signal, typically about 4 MHz, to the ballast microcontroller U12. Ballast microcontroller U12 receives 5V power from the power regulation circuit, which receives 1SV power from the auxiliary low voltage power supply. EEPROM U14 stores information supplied to the ballast microcontroller U12 to tune the electronic ballast to the proper power level, run-up current, and ignition voltage.

The dimming signal Dimm from the dimming circuit is an input to the microcontroller circuit 156 directing the ballast microcontroller U12 to set the power to the HID lamp by adjusting the power reference signal Pref to the power regulation circuit.

The Sweep signal is an output from the microcontroller circuit 156 to the driver circuit to sweep the frequency and generate the required voltage during ignition. The Sweep signal is a function of the ignition voltage signal Vign. The Sweep signal also modulates the lamp current frequency during steady state operation to increase arc stability. The steady state operation is described in U.S. patent application Ser. No. 10/043,586, assigned to the same assignee as the present application and incorporated herein by reference.

The power reference signal Pref is an output from the ballast microcontroller U12 and provides the power regulation circuit with the power reference signal with which to compare the processed sensed power signal to adjust the output of the HID lamp. The power reference signal Pref controls the HID lamp power and is a function of measured rail voltage Vpf and sensed power signal Pwr. The power reference signal Pref can also be a function of the frequency dimming signal Dimm and the calibration constant from EEPROM U14. The SCL and SDA signals communicate stored information from EEPROM U14, such as power level, run-up current, and ignition voltage, to the ballast microcontroller U12.

The supply power factor voltage signals Vpf_3, Vpf_2, Vpf_1, and Vpf_0 are outputs from the ballast microcontroller U12 providing circuit grounds to the resistor array in the PFC control circuit to set the target rail voltage. The grounding of Vpf_3, Vpf_2, Vpf_1, and Vpf_0 is a function of mains voltage Vmains.

The Tx and Rx signal provide communication between the ballast microcontroller U12 and devices external to the electronic ballast through port J1 using an RS232 interface protocol.

The input voltage signal Vmains is an input to the ballast microcontroller U12 from the PFC control circuit 154 and indicates the mains voltage level. The input voltage signal Vmains determines the ballast microcontroller U12 setting the output for the supply power factor voltage signals Vpf_3, Vpf_2, Vpf_1, and Vpf_0.

The scaled PFC output voltage signal Vpf is an input to the ballast microcontroller U12 from the power factor correction circuit 117 and indicates the rail voltage.

The processed power signal Pwr is an input to the ballast microcontroller U12 from the power regulation circuit and indicates the power to the HID lamp. The processed power signal Pwr divided by the lamp current signal Isense+ provides the HID lamp voltage. The processed power signal Pwr, scaled PFC output voltage signal Vpf, a calibration constant from EEPROM U14, and Dimming signal Dimm are used to determine power reference signal Pref, which controls the HID lamp power.

The temperature signal Ts is an input to the ballast microcontroller U12 from the overcurrent protector RT3 of the microcontroller circuit 156 and indicates the temperature of the electronic ballast. The temperature signal Ts can be used by the ballast microcontroller U12 to determine that the electronic ballast should be shut down to avoid damage: the ballast microcontroller shuts down the electronic ballast by toggling the shutdown signal SD.

The ignition voltage signal Vign is an input to the ballast microcontroller U12 from the ignitor and indicates the voltage supplied to the HID lamp for ignition. The ignition voltage signal Vign can be used by the ballast microcontroller U12 to determine the magnitude of the sweep signal Sweep to start the HID lamp.

The lamp current signal Isense+ is an input to the ballast microcontroller U12 from the current regulation circuit, which receives the signal from the resonant half bridge. The lamp current signal Isense+ indicates the current to the HID lamp and is used to control runup current limit signal Iworm. The lamp current signal Isense+ is also used to calculate lamp voltage, which can be used for such functions as determining fault situations.

The ballast microcontroller U12 can determine voltage for the HID lamp by dividing the processed power signal Pwr by the lamp current signal Isense+. The ballast microcontroller U12 can use the processed power signal aPwr, current signal Isense+, and calculated HID lamp voltage to determine the magnitude of power reference signal Pref to control the HID lamp. The power reference signal Pref can also be a function of the frequency dimming signal Dimm and the calibration constant from EEPROM U14.

The ELON signal is an output from the ballast microcontroller U12 to the 120V power supply and determines when the 120V power supply supplies power to the back-up incandescent lamp. The ELON signal turns off the back-up incandescent lamp whenever the HID lamp power, as indicated by the Pwr signal to the ballast microcontroller U12, reaches a predetermined setpoint. A predetermined setpoint, such as about 50% nominal HID lamp power, can be used to indicate the point where the HID lamp provides substantial light.

The run up current limit signal Iworm is an output from the ballast microcontroller U12 to the voltage controlled oscillator of the driver circuit. The run up current limit signal Iworm sets the lamp current limit level and is required at low HID lamp voltages to limit run up current. The run up current limit signal Iworm is a function of lamp current signal Isense+, which indicates the current to the HID lamp.

The inverse power on signal −Pwr_On is the power up/reset signal for initializing the ballast microcontroller U12.

The shutdown signal SD is an output from the ballast microcontroller U12 to the high and low side driver of the driver circuit. The shutdown signal SD turns off the HID lamp on fault conditions, such as no lamp ignition, lamp voltage outside range, ballast temperature high, and mains voltage low.

Figure 4E:
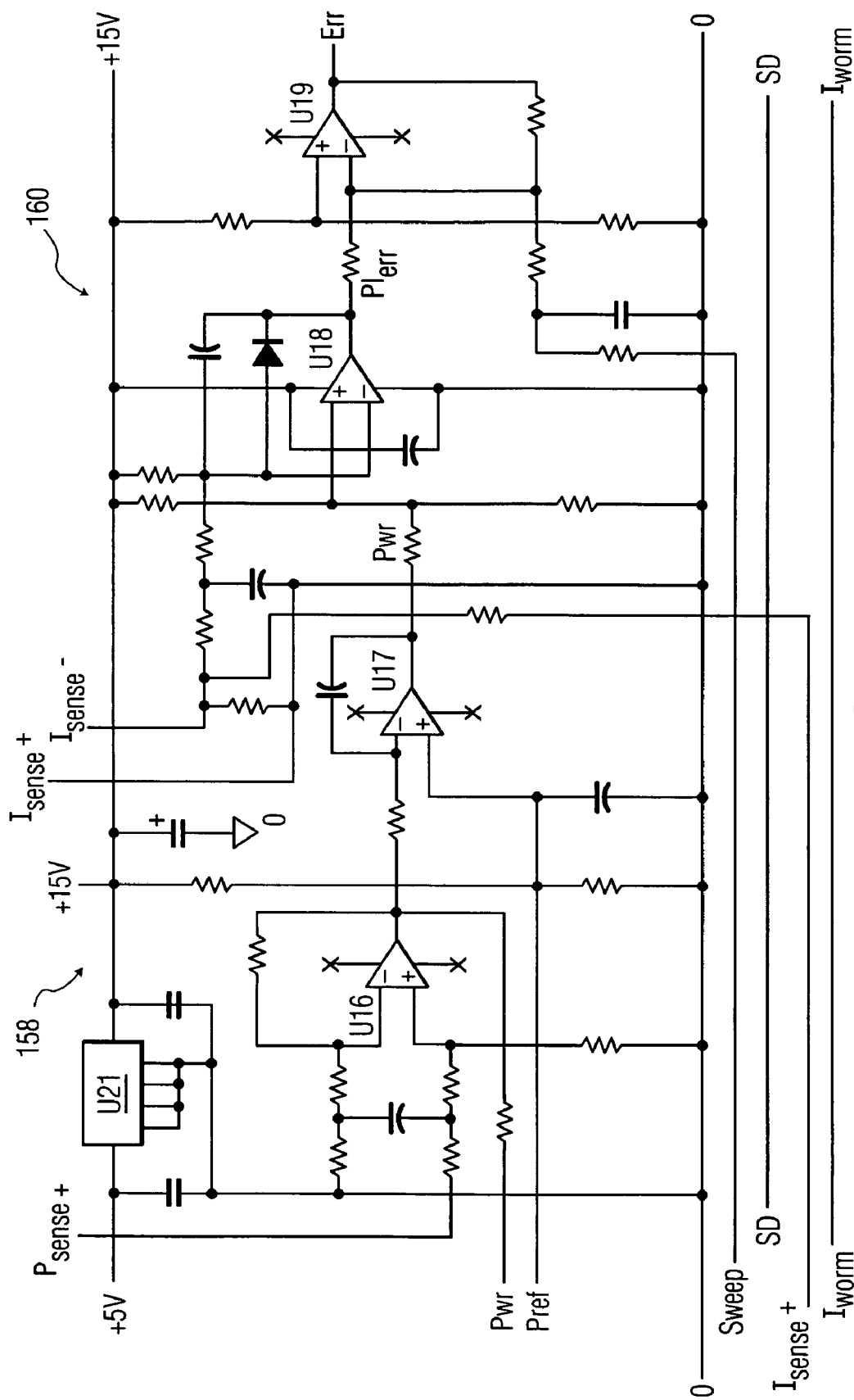

FIG. 4E shows a schematic diagram of power regulation circuit 158 and current regulation circuit 160 for an electronic ballast made in accordance with the present invention. The power regulation circuit 158 compares a sensed lamp power signal to a power reference signal to determine a power error signal, which is passed to the current regulation circuit 160. The current regulation circuit 160 uses the power error signal and sensed lamp current to determine a total error signal, which is passed to the driver circuit 162.

The power regulation circuit 158 includes operational amplifiers U16 and U17. Operational amplifier U16 receives lamp power signal Psense+ which indicates the power through switch Q9 of the resonant half bridge (see FIG. 3). Operational amplifier U16 regulates and limits the lamp power signal to produce a processed power signal Pwr, which is supplied to the operational amplifier U17 and also to the microcontroller circuit. Operational amplifier U17 compares the processed power signal Pwr to the power reference signal Pref from the microcontrbller circuit to produce a power error signal Perr, which is supplied to the current regulation circuit 160. The power regulation circuit 158 also includes voltage regulator U21 to supply power to the microcontroller circuit.

The current regulation circuit 160 includes operational amplifiers U18 and U19. Operational amplifier U18 compares the power error signal Perr to the sensed lamp current signal Isense+ from the resonant half bridge to produce a power/current error signal PIerr, which is supplied to the operational amplifier U19. Operational amplifier U19 regulates and limits the power/current error signal PIerr and produces a total error signal Err, which is supplied to the driver circuit.

The sweep signal Sweep from the microcontroller circuit to the operational amplifier U19 sweeps the frequency and generates the required voltage during ignition and modulates the lamp current frequency during steady state operation to increase arc stability. The steady state operation is described in U.S. patent application Ser. No. 10/043,586, assigned to the same assignee as the present application, and incorporated herein by reference.

Figure 4F:
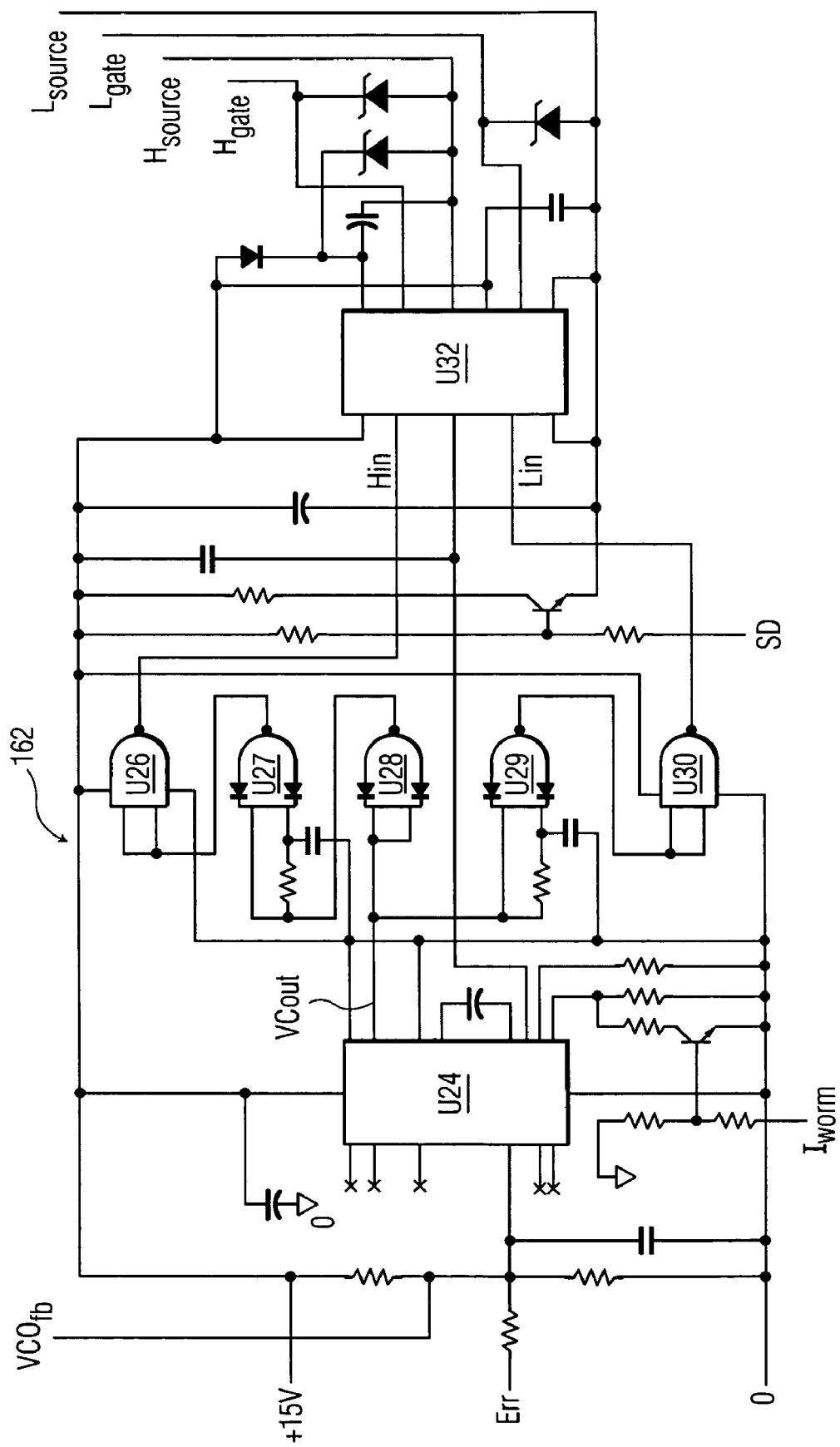

FIG. 4F shows a schematic diagram of a driver circuit 162 for an electronic ballast made in accordance with the present invention. The driver circuit 162 receives the total error signal Err from the current regulation circuit indicating the desired power to be supplied to the HID lamp and provides high gate signal Hgate and low gate signal Lgate to the resonant half bridge to control power to the HID lamp.

The driver circuit 162 comprises voltage controlled oscillator (VCO) U24, driver gates U26, U27, U28, U29, U30, and high and low side driver U32. VCO U24 receives the total error signal Err from the current regulation circuit and provides a clocked VCO output signal VCOUT proportional to the voltage of the total error signal Err. The runup current limit signal Iworm or the run shutdown signal SD from the microcontroller circuit can shut down the VCO U24 to turn off the HID lamp, if required.

The driver gates receive the VCO output signal VCOUT, which passes through three driver gates U26, U27, U28 to produce the high input signal Hin and through two driver gates U29 and U30 to produce the low input signal Lin. The use of an odd number of driver gates to produce the high input signal Hin and an even number of driver gates to produce the low input signal Lin results in the high input signal Hin and the low input signal Lin having opposite polarity with deadtime between the two signals.

High and low side driver U32 regulates the high input signal Hin and the low input signal Lin from the driver gates and provides the high gate signal Hgate and low gate signal Lgate to the resonant half bridge. The run shutdown signal SD from the microcontroller circuit can shut down the VCO U24 to turn off the HID lamp, if required.

Figure 5:
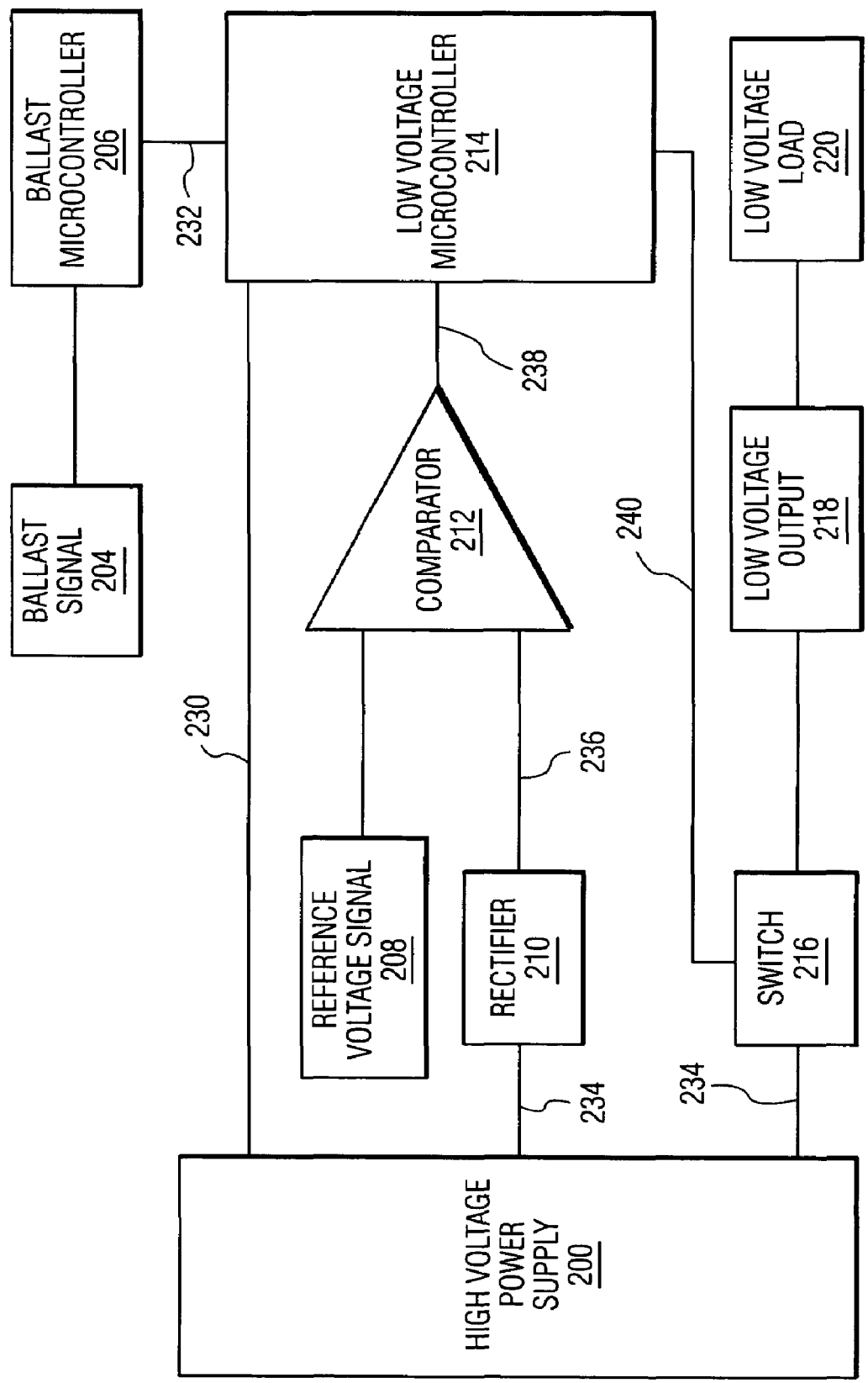
FIG. 5 shows a block diagram of a low voltage output circuit for an electronic ballast with low voltage output made in accordance with the present invention.

FIG. 5 shows a block diagram of a low voltage output circuit for an electronic ballast with low voltage output made in accordance with the present invention. The high voltage power from the high voltage power supply 200 is reduced to a lower voltage to power auxiliary low voltage loads 220, such as a back-up incandescent lamp, an insulation detector, and/or other components or circuits. If used to power a back-up incandescent lamp, the low voltage output circuit can be responsive to the HID lamp power to turn the back-up incandescent lamp on and off as required. In other embodiments, the low voltage output 218 can be used to power other components or circuits, such as an insulation detector.

In the present example, the high voltage power supply 200 provides about 200-277 volts, which is equivalent to the mains voltage. Those skilled in the art will appreciate that the high voltage power supply 200 can be any power supply in the electronic ballast that it is desirable to step down to a lower voltage for a particular application, including the power supply for mains voltage. The voltage of the low voltage output 218 can be determined through programming the low voltage microcontroller 214 to provide the particular voltage required for a particular low voltage load 220, such as about 120 volts for a back-up incandescent lamp.

Back up lighting for HID lamp systems is often desirable because HID lamps have a low light output during the warm-up phase, which occurs for about a minute after applying power to the HID lamp. HID lamps also need to cool down after they are turned off, typically making them unavailable for about 5 to 15 minutes. A back-up incandescent lamp supplies lighting when the HID lamp is not burning or burning at a low light level. The back-up incandescent lamp can be a halogen lamp or any other 120V lamp as desired.

High voltage power supply 200 provides low voltage output 218 to the low voltage load 220 through the switch 216. The switch 216 can be a triac, such as triac Q1 of FIG. 2B, or another switch, such as a high power switching transistor or a thyristor. Exemplary triacs are the BTA216 and BT136 manufactured by Philips Semiconductors. Referring to FIG. 5, the low voltage output 218 to the low voltage load 220 is determined by the switching of switch 216 in response to the low voltage drive signal 240 from low voltage microcontroller 214. The low voltage microcontroller 214 uses the voltage and frequency of the high voltage power supply 200 to determine the low voltage drive signal 240. High Voltage (HV) voltage amplitude signal 230 from the high voltage power supply 200 indicates the voltage of the high voltage power supply 200 to the low voltage microcontroller 214. HV zero crossing signal 238 indicates the frequency of the high voltage power supply 200. Those skilled in the art will appreciate that the voltage and frequency of the high voltage power supply 200 can be determined by a number of other methods, such as resistive dividers, capacitive circuits, and capacitive dividers.

To produce the HV zero crossing signal 228, the high voltage power supply 200 supplies high voltage power 234 to rectifier 206, which converts the high voltage power 234 to a HV voltage signal 236. Comparator 212 compares a reference voltage signal 208 to the HV voltage signal 236 to produce an HV zero crossing signal 238 representative of the frequency of the high voltage power supply 200. The low voltage microcontroller 214 employs a preprogrammed look-up table to look-up the desired timing/phase angle of the switch 216 based on the HV voltage amplitude signal 230 and corrected for the frequency of the high voltage power supply 200 as indicated by the HV zero crossing signal 238. The values in the look-up table can be determined by calculation and experiment, and can account for non-linearity in the system.

The low voltage microcontroller 214 can be responsive to a switching signal 232 to switch the low voltage output 218 on and off. A ballast signal 204 can be provided to the ballast microcontroller 206 to produce the switching signal 232. The ballast signal 204 can be indicative of a number of parameters inside or outside the ballast depending on the particular application of the low voltage output circuit. The ballast microcontroller 206 can measure the ballast signal 204 against predetermined setpoints or electronic ballast parameters to determine the desired state of the switching signal 232. The low voltage microcontroller 214 can be responsive to the switching signal 232 to turn the low voltage drive signal 240 on and off as required. Those skilled in the art will appreciate that a number of switching circuits using microcontrollers, transistors, mechanical switches, and combinations thereof, can be used to provide the switching signal 232.

In one present embodiment, the low voltage output circuit is used to power a back-up incandescent lamp as the low voltage load 220, with the ballast signal 204 being an HID lamp power signal and the switching signal 232 being the ELON control signal. See FIG. 2B. The low voltage output circuit can be responsive to the HID lamp power signal to turn the back-up incandescent lamp on and off as required. The HID lamp power signal indicates the HID lamp power. The HID lamp power signal is provided to the ballast microcontroller 206, which compares the HID lamp power signal to a predetermined HID lamp power setpoint, such as about 50% nominal HID lamp power, to determine if the back-up incandescent lamp should be on or off. If the HID lamp power is above the predetermined HID lamp power setpoint, the ballast microcontroller 206 sets the ELON control signal so that the low voltage microcontroller 214 turns off the low voltage drive signal 240 to the switch 216, turning off the back-up incandescent lamp. If the HID lamp power is below the predetermined HID lamp power setpoint, the ballast microcontroller 206 sets the ELON control signal so that the low voltage microcontroller 214 turns on the low voltage drive signal 240 to the switch 216, turning on the back-up incandescent lamp.

It is important to note that FIGS. 1-5 illustrate specific applications and embodiments of the present invention, and are not intended the limit the scope of the present disclosure or claims to that which is presented therein. Upon reading the specification and reviewing the drawings hereof, it will become immediately obvious to those skilled in the art that myriad other embodiments of the present invention are possible, and that such embodiments are contemplated and fall within the scope of the presently claimed invention.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

The invention claimed is:

1. An electronic ballast with a voltage circuit for an insulation detector comprising:
   a lamp power circuit configured to operate a primary lamp;
   a first supply operably connected to a ballast control circuit to provide a first voltage signal to the ballast control circuit;
   a second supply operable to provide a second voltage signal to the insulation detector; and
   a controller configured to switch an input signal to provide the second voltage signal having a desired amplitude and a desired frequency.

2. The electronic ballast of claim 1, wherein the controller is responsive to a voltage amplitude of an input voltage signal to provide the desired amplitude of the second voltage signal.

3. The electronic ballast of claim 2, wherein the controller is further responsive to a frequency of the input voltage signal to provide the desired frequency of the second voltage signal.

4. An electronic ballast with a voltage circuit for an insulation detector comprising:
   first means for providing a first voltage signal to operate a lamp;
   second means for providing a second voltage signal to ballast control means; and
   third means for providing a third voltage signal to the insulation detector, wherein the third means include control means for switching an input signal to provide the third voltage signal having a desired amplitude and a desired frequency.

5. The electronic ballast of claim 4, further comprising means for switching the input signal to generate the third voltage signal responsive to a drive signal determined from the input signal by the control means.

6. The electronic ballast of claim 5, wherein the drive signal is determined from an amplitude and a frequency of the input signal.

* * * * *